United States Patent
Miller

(10) Patent No.: US 8,428,054 B2
(45) Date of Patent: Apr. 23, 2013

(54) DAISY CHAINING DEVICE SERVERS VIA ETHERNET

(75) Inventor: Daryl R. Miller, Rancho Santa Margarita, CA (US)

(73) Assignee: Lantronix, Inc., Irvine, CA (US)

( * ) Notice: Subject to any disclaimer, the term of this patent is extended or adjusted under 35 U.S.C. 154(b) by 762 days.

(21) Appl. No.: 11/273,791

(22) Filed: Nov. 14, 2005

(65) Prior Publication Data

US 2007/0110081 A1    May 17, 2007

(51) Int. Cl.
*H04L 12/50* (2006.01)
*H04Q 11/00* (2006.01)

(52) U.S. Cl.
USPC ............ 370/360; 370/401; 370/465; 370/503

(58) Field of Classification Search .................... 370/401
See application file for complete search history.

(56) References Cited

U.S. PATENT DOCUMENTS

| | | | |
|---|---|---|---|
| 4,890,102 A * | 12/1989 | Oliver | 714/712 |
| 5,555,100 A * | 9/1996 | Bloomfield et al. | 358/402 |
| 5,598,418 A * | 1/1997 | Lo et al. | 370/501 |
| 6,139,177 A | 10/2000 | Venkatraman et al. | |
| 6,157,464 A * | 12/2000 | Bloomfield et al. | 358/407 |
| 6,259,978 B1 * | 7/2001 | Feely | 701/19 |
| 6,373,841 B1 | 4/2002 | Goh et al. | |
| 6,735,635 B1 * | 5/2004 | Rodriquez et al. | 709/248 |
| 6,793,539 B1 * | 9/2004 | Lee et al. | 439/701 |
| 7,376,760 B1 * | 5/2008 | Ivchenko et al. | 710/8 |
| 7,433,302 B2 * | 10/2008 | Allen | 370/224 |
| 7,447,762 B2 * | 11/2008 | Curray et al. | 709/224 |
| 2003/0099076 A1 * | 5/2003 | Elkayam et al. | 361/90 |
| 2003/0142683 A1 * | 7/2003 | Lam et al. | 370/401 |
| 2004/0162912 A1 | 8/2004 | Taraci | 709/233 |
| 2005/0044431 A1 * | 2/2005 | Lang et al. | 713/300 |
| 2005/0129033 A1 | 6/2005 | Gordy | |
| 2005/0245127 A1 * | 11/2005 | Nordin et al. | 439/540.1 |
| 2006/0116023 A1 * | 6/2006 | Spitaels et al. | 439/532 |
| 2006/0198389 A1 * | 9/2006 | Eriokson et al. | 370/466 |
| 2006/0285802 A1 * | 12/2006 | Fingler et al. | 385/88 |
| 2007/0025240 A1 * | 2/2007 | Snide | 370/217 |

FOREIGN PATENT DOCUMENTS

WO    2004038900 A2    5/2004

* cited by examiner

*Primary Examiner* — Jae Y Lee
(74) *Attorney, Agent, or Firm* — Fish & Associates, PC

(57) ABSTRACT

A device server intended for attaching serial devices to a network includes Ethernet communications, an Ethernet switch, and serial communication capability so that multiple device servers are connected in a "daisy chain" or series pattern. Galvanic isolation of the power supply from the housing and communication ports, screw terminal and modular connections, DIN rail mounting, broad power supply voltage ranges or "Power-over-Ethernet" and operator visible indicator lamps with a pulse stretching feature greatly simplify installation and use.

19 Claims, 4 Drawing Sheets

Figure 1
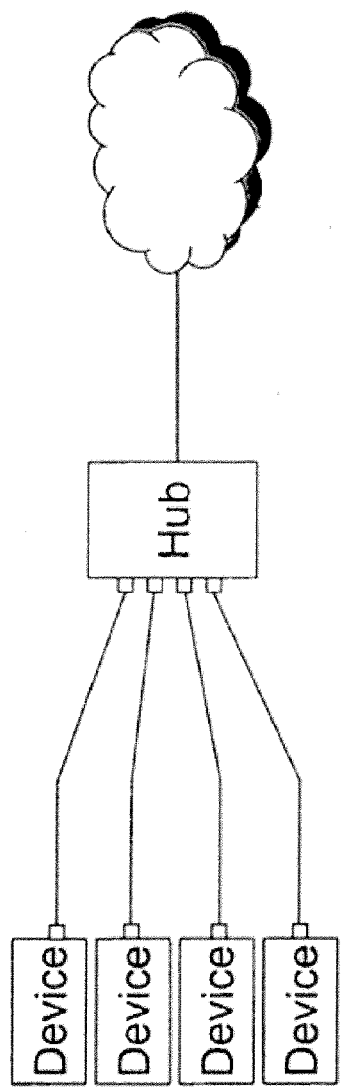
Fig. 1a
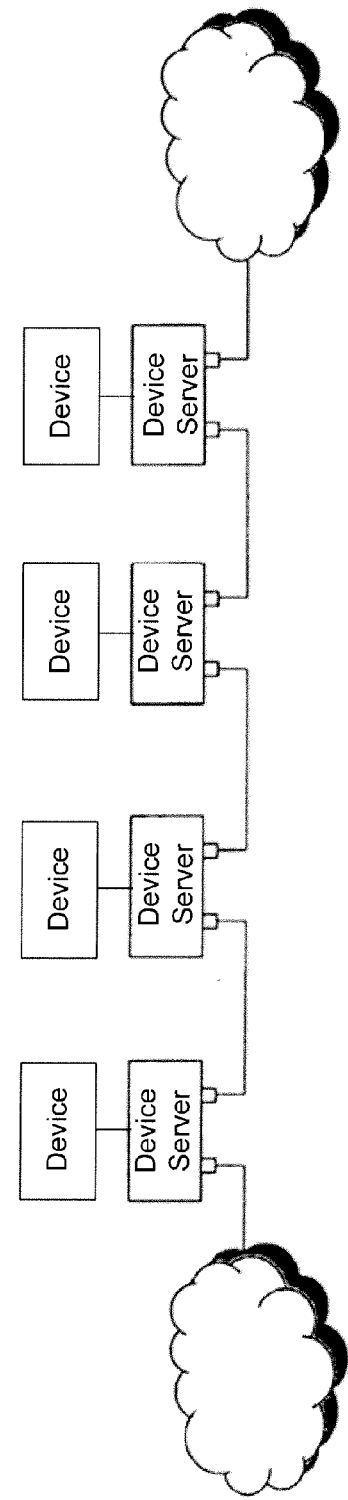
Fig. 1b

DAISY CHAINING DEVICE SERVERS VIA ETHERNET

FIELD OF THE INVENTION

The field of the invention is serial communications over Ethernet.

BACKGROUND

There is a long history of remote communication and control of instruments, especially instruments and devices with a serial interface. Initially control elements were interfaced to devices using direct serial connections, but with the ubiquity of networks and the world wide web, remote control via web browsers became feasible (See as examples U.S. Pat. Nos. 6,139,177 and 6,373,841). Devices designed with native web interfaces could connect directly to a computer network. And to accommodate the vast base of legacy devices without built in network connections, adapters were developed that connected a serial device to a network. These Serial to Ethernet converters, also referred to as "device servers", have been developed to an advanced degree, both in software, where innumerable pre-programmed, customizable and programmable features are supported, and in hardware, where the entire circuitry for Ethernet to serial connection has been integrated into the network connector itself (U.S. Pat. No. 6,881,096).

But practical difficulties still remain. Consider that originally, high speed networks were implemented as a long wire with multiple taps for network peripherals. However, as systems developed, modern IT equipment evolved to a "star" configuration, where an Ethernet hub, switch or router with multiple network ports is connected point to point with a surrounding group of devices, one network port on the central hub switch or router being consumed by each connected device.

For system compatibility, device servers incorporated that architecture. This has many advantages well understood in the networking field, but in some fields of use, especially industrial and building automation, this "star" topology is not optimal. For example, in these fields, standard practice for wiring of sensors and controls is to connect multiple devices in series, one after the other, on a single long run of cable (commonly, "daisy-chaining") and to implement a serial communication standard such as RS485.

Consequently, networking solutions that maintain a series topology have achieved some popularity, notably in these fields of industrial and building automation. LonWorks™ by Echelon is one example. While this series topology is beneficial in minimizing wiring and installation expense in these fields, the lack of a strong unifying standard such as Ethernet has fragmented these markets with various proprietary hardware and software offerings, and customers have as a result become locked into a particular manufacturer's offerings, limiting their ability to incorporate new networking innovations to what their proprietary vendor can implement and support. Thus compared over the last decade to the dramatic progress of the world's Ethernet community, industrial and building automation systems based on serial communications lag far behind, and the gap is increasing at an increasing rate. It would be of substantial benefit to incorporate the ability to make series connections but based on Ethernet standards.

Additionally, as a practical limitation, the equipment, tools and techniques required to fabricate and install the types of power supply and communications connectors used in traditional IT networks differ significantly from common practice and skills found in, for example, the construction industry. This mismatch makes the physical installation and maintenance of the network more difficult.

This and all other referenced patents and applications are incorporated herein by reference in their entirety. Furthermore, where a definition or use of a term in a reference, which is incorporated by reference herein is inconsistent or contrary to the definition of that term provided herein, the definition of that term provided herein applies and the definition of that term in the reference does not apply.

Thus, there is still a need for a device server that considers these non-IT environments in its design yet brings the benefits of Ethernet standards.

SUMMARY OF THE INVENTION

The present invention provides apparatus, systems and methods for facilitating daisy chain connection between first and second other devices, in which a circuit board includes an Ethernet switch function, first and second Ethernet connections, and a serial communications port.

In contemplated embodiments, the service server can include one or more of a second serial communications port, a second serial communications port, a third Ethernet connection, and a Wireless network connection, each of which can be operatively coupled to the circuit board.

The device server can be configured to accept either AC or DC power, but is preferably configured to accept both. AC power preferably falls within the range 9 to 24 volts RMS, and DC power preferably falls within the range 9 to 30 volts. Power can also be provided by Power over Ethernet (POE). The Ethernet connections are preferably galvanically isolated from other internal circuitry by at least 1500 volts, and more preferably galvanically isolated from the power supply input by at least 2000 volts.

Also in preferred embodiments, the power connections are made via screw terminals. Communications connections can also advantageously be made via screw terminals and/or multi-contact connectors.

The circuit board is preferably housed in a housing having features for mounting the product to a supporting structure, which can, for example, comprise a DIN rail. The circuit board can advantageously include receive and transmit indicators which are visible from outside the housing. Such indicators preferably receive pulse stretched signals from the circuit board.

The Ethernet switch function(s) can be operationally substantially equivalent to an Ethernet hub function, and/or an Ethernet router function.

In an especially preferred embodiment, a Serial to Ethernet Converter has a plurality of serial ports wherein at least two serial ports are logically connected in that information arriving at a first port is passed internally through the device server to a second port, and information arriving at the second port is passed internally through the device server to the first port.

Various objects, features, aspects and advantages of the present invention will become more apparent from the following detailed description of preferred embodiments of the invention, along with the accompanying drawings in which like numerals represent like components.

BRIEF DESCRIPTION OF THE DRAWING

FIG. 1 describes Ethernet topologies;

DETAILED DESCRIPTION

FIG. 1 compares two topologies. FIG. 1a shows an Ethernet "star" topology, while FIG. 1b shows a "daisy chain" topology wherein devices are connected in series, one after the other in linear fashion, by using two Ethernet ports on each daisy chained device.

Figure 2:
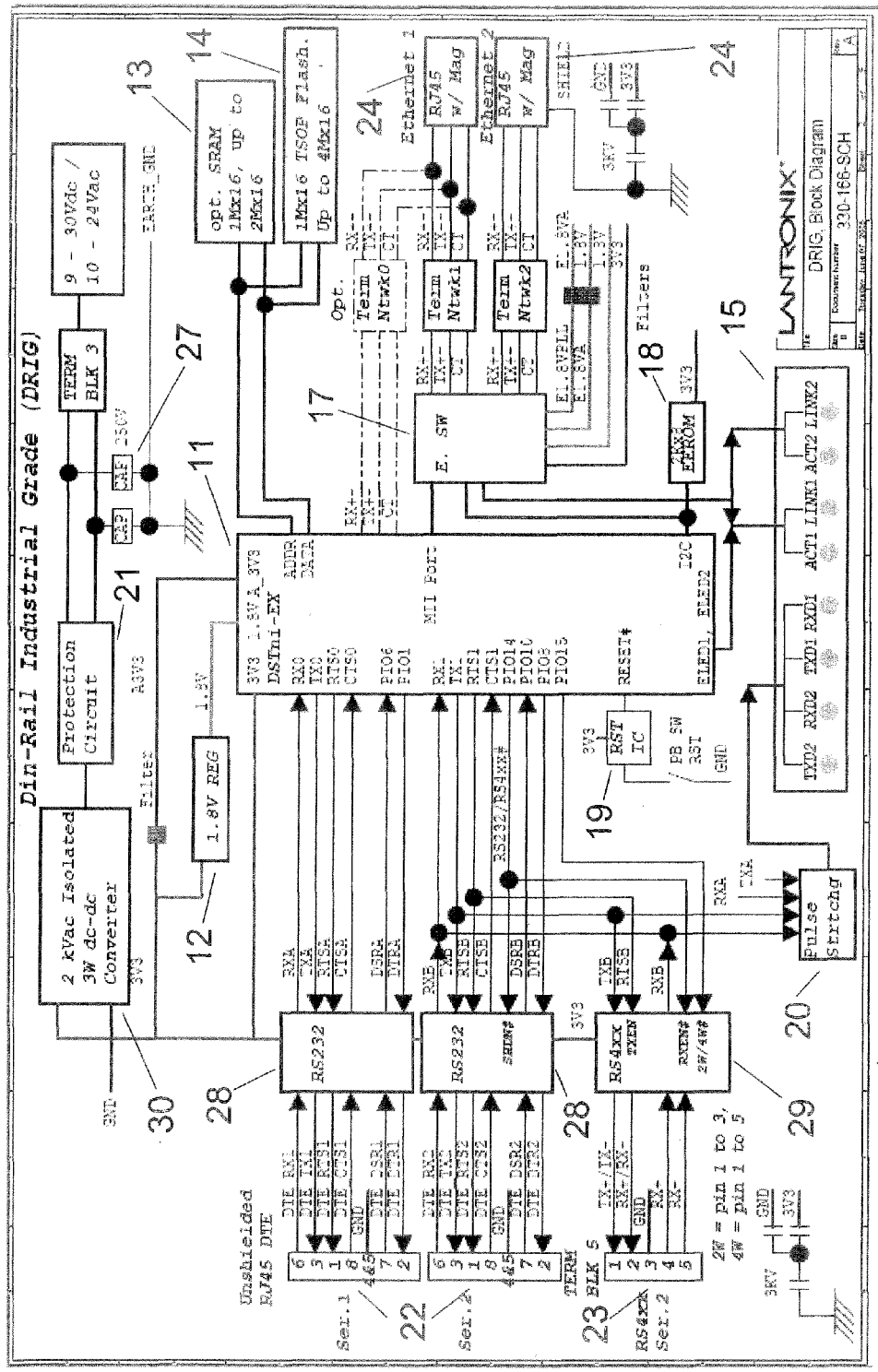
FIG. 2 is a schematic of the device server circuit board.

Referring to FIG. 2, in a preferred embodiment the device server circuit board 10 interconnects the device server circuitry. The control microprocessor 11 is DSTni-EX, a System-on-chip (SOC) integrated circuit. DSTni-EX includes serial communications ports, on-board RAM and ROM, an Ethernet MAC and PHY, and ample address and data lines to connect and control lights and GPIO pins. A DC to DC converter 30, capable of supplying a 3 Watt load is galvanically isolated from input to output by a breakdown rating of 2000 volts. A protection circuit 21 prevents electrical overstress of the converter by absorbing and dissipating excess joules of energy. The protection circuit also accepts AC and DC input and with diode steering provides DC to the input of the converter. The wide range of input allowed, 9 to 30 volts DC and 9 to 24 volts AC accommodate varying external supplies with a single device server PCB 10. Electrostatic Discharge (ESD) and Noise Filtering capacitance 27 is provided on the power supply input lines.

Power from the DC to DC converter output is further filtered and provided to the DSTni-EX 11 as 3.3V, and the converter output also drives a 1.8V linear regulator 12 for core voltage to the DSTni-EX. Other components on the PCB powered from the 3.3V source include varying amounts of SRAM 13 and FLASH memory 14, serial line drivers for RS232 28 and 422/485 protocols 29, an Ethernet switch 17, a small EEROM 18, a reset IC 19, pulse stretching circuitry and status and activity LEDs 15.

Figure 3:
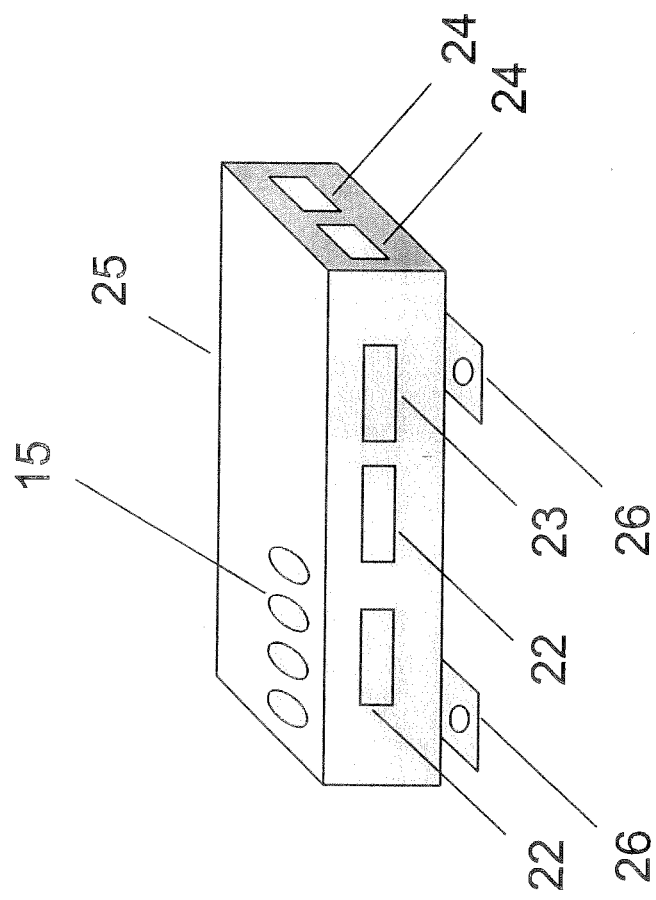
FIG. 3 is a perspective view of a device server.

FIG. 3 shows a perspective view of the device server within a housing 25. Basic to a preferred embodiment of a daisy chained device server are at least one of the serial ports 22 and at least two of the Ethernet ports 24 all shown exposed through the walls of the housing. It is apparent that there can be variations on the physical nature of the serial interface and the communications protocol implemented. For example, also shown is a RS4XX (an abbreviation for RS422 or RS485 standards) serial port 23. Activity and status indicators 15 are shown visible from outside the housing. The housing can further comprise mounting features 26 which facilitate attachment to supporting structures. Connection for power is not illustrated.

Figure 4:
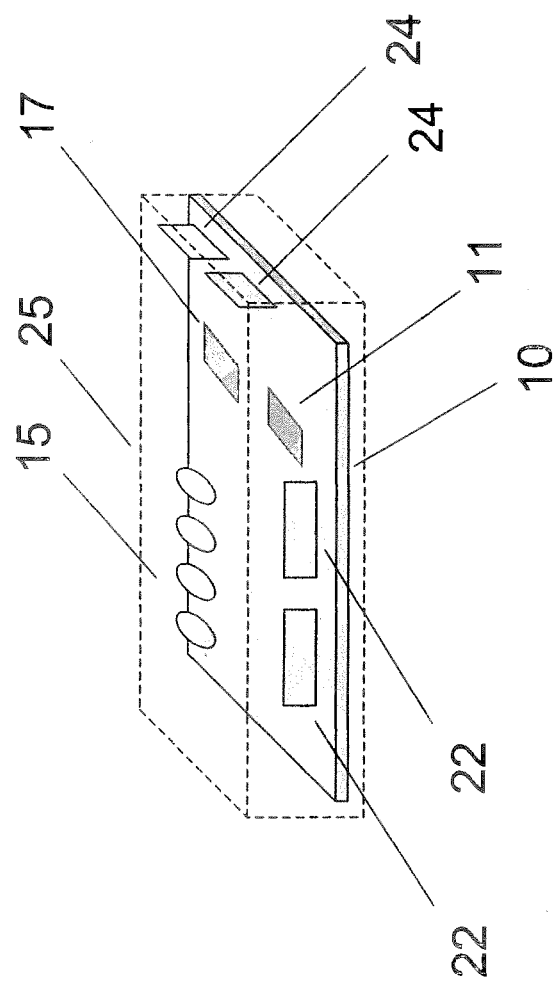
FIG. 4 shows an internal view of a device server.

FIG. 4. shows an internal view of the device server, with housing 25 removed. The circuit board 10 contains the Ethernet ports 24, the serial ports 22, activity and status indicators 15, a processor 11 and a hardware Ethernet switch 17.

1. Operation

The device server function, most broadly, is to translate information between serial ports and Ethernet ports. To do so, the DSTni-EX processor executes software instructions stored in the Flash memory. These software instructions are organized logically into a device server application, a web server, an operating system, and drivers for hardware elements. Additionally, other software, such as HTML and Java applets can be stored in Flash or RAM and can be transmitted over one of the Ethernet ports to a remote client by the web server module. It is possible for software stored in Flash to be modified, and custom versions of the device server application code are commonly developed for a specific need or purpose. A kit containing development software and selected source and object code for the device server application is available and can be used by trained programmers to create, load, execute and debug such custom device server applications.

It is contemplated that an inventive element of the device server is the inclusion of an Ethernet switch function. In practice, the Ethernet switch function can be implemented either as hardware or software, or in a combination of both. Note that there are many elaborations of packet handling functions, sometimes abstracted into "hub", "switch", and "router" functions. For simplicity in discourse, all such packet handling functions will be abstracted into the "switch" function herein, by which term we mean all ways of handling and routing packets as they arrive at any of the network ports of the device server.

In preferred embodiments, the switch function is performed by an Integrated Circuit chip. A preferred embodiment can use an integrated circuit such as Micrel KS8993M configured on the circuit board as shown in FIG. 3. This integrated circuit offers an extensive feature set that includes tag/port-based VLAN, QoS priority, switch management, MEB counters and interfaces to MII (Media Independent Interface) and CPU for design flexibility to address emerging Ethernet applications. The Integrated Circuit chip interfaces to the DSTni-EX through the MII (Media Independent Interface) port on the DSTni-EX, and further drives two Ethernet ports. Because of the two Ethernet ports and because the switch function handles packet routing between those ports, the device server is capable of being installed in a "daisy-chained" manner with similar device servers or other compatible network equipment. In operation, the switch function can implement a standard and well-documented Ethernet packet switching function described in IEEE 802.1d Spanning Tree Protocol. Because the switch function builds and maintains tables of MAC addresses observed on each device server Ethernet port the switch function is able to determine which Ethernet port to employ when passing on packets not intended for the present device server. Thus normal network communications not intended for the current device server are handled appropriately and transparently both up and down the daisy chain connection.

In more preferred embodiments software running in the DSTni-EX can alternatively perform some or all of the switch function, reducing the requirements on, or eliminating, a hardware switch element.

Additional Ethernet ports can be incorporated in the device server, and additional switch functions can be implemented with two or more ports as desired. A preferred embodiment is compliant with relevant Ethernet standards as defined for general network equipment.

It should be understood that Wireless Ethernet can be substituted for any or all wired Ethernet ports, in any existing wireless standard. Also contemplated are all future wireless network standards.

Installation and use of the device server is highly simplified with various degrees of galvanic isolation provided. 1500 volts, 2000 volts and even higher are included within the inventive material herein.

Further simplification in the installation and use of the device server is accomplished via the incorporation of screw terminal connections for communications wiring and power supply wiring. Also, modular terminals or other forms of connectors can be provided for simplified connection and disconnection without additional wire removal.

A housing for the circuitry can be provided, and it can have provision for geometric features to facilitate attachment to a support structure. Such attaching features can include mounting ears for fasteners, tabs, brackets, clips and other facilitating shapes and surfaces. Also contemplated are magnetic and chemical attachment mechanisms. Attaching features can be designed to existing or future standards, such as the provision of integral DIN rail attachment features.

Receive and Transmit indicator lamps are visible from outside the housing, and the indicator lamps are driven with a pulse stretching circuit so that rapid signal transitions to and from a given state will be extended in duration to be visible.

In addition power for operation can be supplied to the device server via Power over Ethernet (POE), as described in IEEE Std 802.3af™-2003. This document explains the capabilities and requirements for devices receiving operating power over the Ethernet Media Dependent Interface (MDI).

Beyond serial communications ports, device servers can supply other interface standards and protocols, such as USB and Firewire. Analog signals can be supported for certain specific or general applications, such as Analog to Digital converter input, voltage and current monitoring or other sensing and control applications. Additionally, the device server can implement more I/O capability in the form of General Programmable I/O (GPIO) pins—pins that can be defined as input, output or bidirectional digital pins, or which can be assigned a definition of fixed or varying nature, as supported by internal device server software.

It is contemplated that an inventive element provides a device server or Serial to Ethernet Converter with a plurality of serial ports wherein at least two ports are logically connected in that information arriving at a first port is passed internally through the device server to a second port, and information arriving at the second port is passed internally through the device server to the first port. This effectively provides a "daisy chained" capability, port to port, on the serial port side of the Serial to Ethernet Converter. Consistent with the Serial to Ethernet conversion function, serial information passing between serial ports can, if desired, be further linked in a unidirectional or a bidirectional manner with the Ethernet communications interfaces.

Thus, specific embodiments and applications of daisy chaining device servers via Ethernet have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A device server for facilitating daisy chain connection over Ethernet between first and second other devices through a serial port, comprising:
   a housing having features for mounting the server to a supporting device;
   a circuit board located within the housing includes an Ethernet switch configured to handle packet routing among Ethernet ports, the switch comprising an integrated circuit chip whereby the switch is configured by a control microprocessor through a Media Independent Interface port also located on the circuit board and further wherein the integrated circuit chip drives Ethernet ports wherein said Ethernet switch determines which Ethernet port to employ when passing on packets not intended for the present device server;
   at least two Ethernet ports logically connected so that information arriving at a first port is passed internally through the Ethernet switch to a second port, and information arriving at the second port is passed through the Ethernet switch to the first port to provide a daisy chained configuration of devices over an Ethernet connection;
   a serial communications port exposed through a wall of the housing logically connected to at least one of the two Ethernet ports to pass information from the first device external to the device server to provide the daisy chained configuration over the Ethernet connection of serial devices;
   a second serial communications port exposed through a wall of the housing logically connected to at least one of the two Ethernet ports through the control microprocessor having a different protocol from a protocol of the serial communications port;
   wherein the circuit board is further configured to provide a daisy chaining capability among the serial ports as well as among the Ethernet ports;
   wherein the circuit board can advantageously include receive and transmit indicators which are visible from outside the housing, the indicators receive pulse stretched signals from the circuit board; and
   circuitry coupled to the circuit board receiving power via Power over Ethernet (POE).

2. The device server of claim 1 further comprising a second serial communications port coupled to the circuit board.

3. The device server of claim 1 further comprising a third Ethernet connection coupled to the circuit board.

4. The device server of claim 1 further comprising a Wireless network connection coupled to the circuit board.

5. The device server of claim 1 further comprising Ethernet connections which are galvanically isolated from other internal circuitry by at least 1500 volts.

6. The device server of claim 1 further comprising a serial connection galvanically isolated from a power supply input by at least 2000 volts.

7. The device server of claim 1 further comprising power connections made via screw terminals.

8. The device server of claim 1 further comprising communication connections made via screw terminals.

9. The device server of claim 1 further comprising communication connections made through mating multi-contact connectors.

10. The device server of claim 1 further comprising features in the housing for mounting the device server to DIN rail.

11. The device server of claim 1 further comprising the circuit board configured to accept both AC and DC power.

12. The device server of claim 11 wherein the circuit board receives AC power within the range 9 to 24 volts RMS.

13. The device server of claim 11 wherein circuit board receives DC power within the range 9 to 30 volts.

14. The device server of claim 1 wherein the Ethernet switch is operationally substantially equivalent to an Ethernet hub function.

15. The device server of claim 1 wherein the Ethernet switch is operationally substantially equivalent to an Ethernet router function.

16. The device server of claim 1 wherein the control microprocessor includes a serial communications port and an Ethernet MAC and PHY to handle data transfer from the serial port to at least one of the Ethernet ports.

17. The device server of claim 16 wherein the integrated circuit chip handles packet routing between the at least two Ethernet ports external to the control microprocessor.

18. The device server of claim 17 wherein the control microprocessor translates information between the serial communications port, the second serials communications port and the at least two Ethernet ports by executing instructions stored in flash memory.

19. The device server of claim 1 wherein at least a portion of the Ethernet switch comprises software executed by the control microprocessor.

* * * * *